(12) United States Patent
Wang

(10) Patent No.: US 8,625,225 B1
(45) Date of Patent: Jan. 7, 2014

(54) DISK DRIVE COMPENSATING FOR ASYMMETRY OF MAGNETORESISTIVE READ ELEMENT

(75) Inventor: Alvin J. Wang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 205 days.

(21) Appl. No.: 13/220,507

(22) Filed: Aug. 29, 2011

(51) Int. Cl.
G11B 5/09 (2006.01)
G11B 5/035 (2006.01)

(52) U.S. Cl.
USPC .............................. 360/65; 360/25

(58) Field of Classification Search
None
See application file for complete search history.

(56) References Cited

U.S. PATENT DOCUMENTS

| | | | |
|---|---|---|---|
| 5,982,173 A | 11/1999 | Hagen | |
| 6,400,518 B1 | 6/2002 | Bhaumik et al. | |
| 6,449,110 B1 | 9/2002 | DeGroat et al. | |
| 6,587,292 B1 | 7/2003 | Ashley et al. | |
| 6,934,100 B2 | 8/2005 | Ueno | |
| 7,079,342 B1 | 7/2006 | Han et al. | |
| 7,161,752 B1 | 1/2007 | Cheng | |
| 7,203,013 B1 | 4/2007 | Han et al. | |
| 7,242,545 B1 | 7/2007 | Cheng | |
| 7,298,570 B1 | 11/2007 | Han | |
| 7,511,910 B1 | 3/2009 | Han | |
| 7,548,389 B1 | 6/2009 | Han | |
| 7,643,233 B2 | 1/2010 | Bliss et al. | |
| 7,817,368 B1 | 10/2010 | Han | |
| 7,848,042 B1 | 12/2010 | Marrow | |
| 7,881,006 B2 | 2/2011 | Raghunathan et al. | |
| 7,885,031 B1 | 2/2011 | Han | |
| 2002/0154430 A1 | 10/2002 | Rae et al. | |
| 2003/0086195 A1* | 5/2003 | Ashley et al. | 360/46 |
| 2005/0180298 A1* | 8/2005 | Horibe et al. | 369/124.1 |
| 2005/0190471 A1 | 9/2005 | Ueno | |
| 2011/0019301 A1* | 1/2011 | Cao et al. | 360/39 |

* cited by examiner

*Primary Examiner* — Regina N Holder

(57) ABSTRACT

A disk drive is disclosed comprising a head actuated over a disk, the head comprising a magnetoresistive (MR) read element. An analog read signal emanating from the MR read element is amplified to generate an amplified analog read signal. The amplified analog read signal is filtered in continuous-time to extract a dc component. An amplitude of the amplified analog read signal is measured in continuous-time, and an asymmetry in the amplified analog read signal is estimated in response to the dc component and the amplitude. The amplified analog read signal is modified in response to the estimated asymmetry to generate a compensated analog read signal.

22 Claims, 4 Drawing Sheets

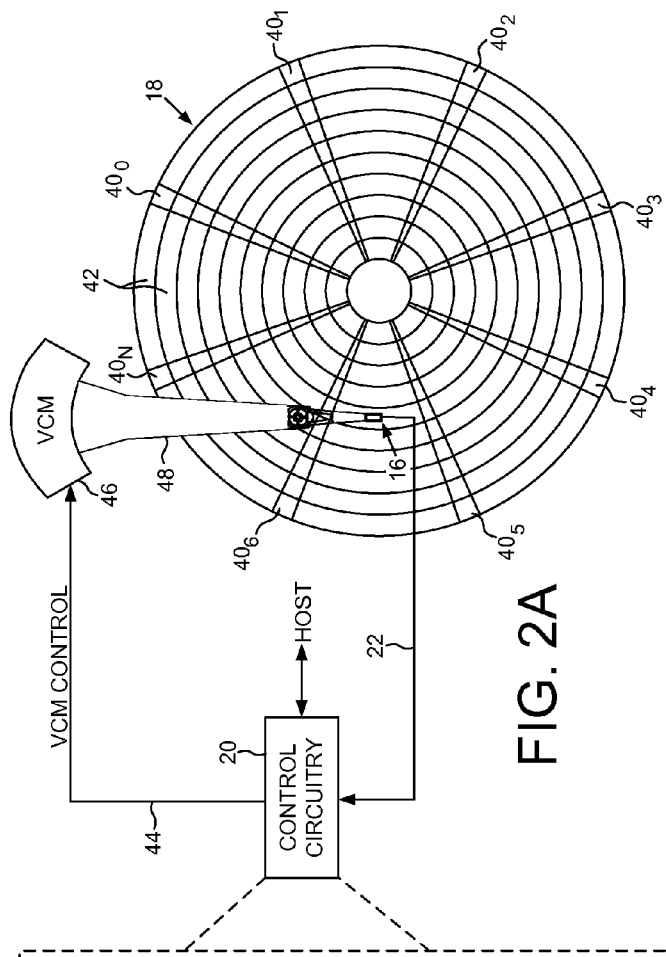
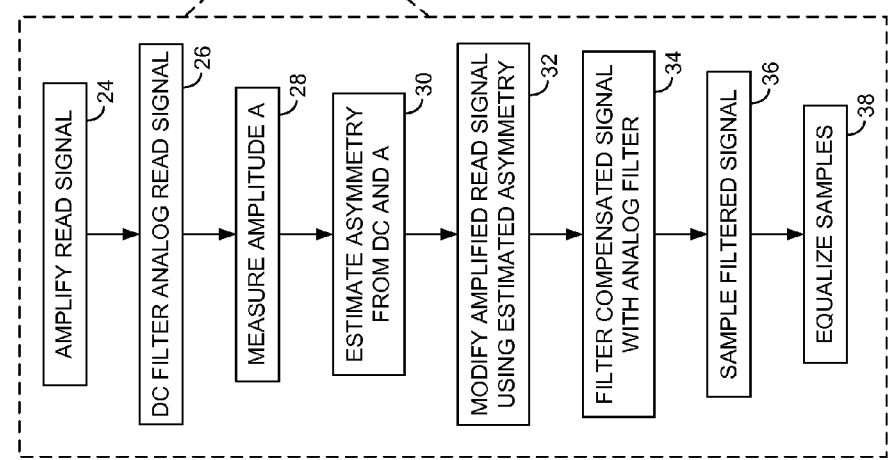

DISK DRIVE COMPENSATING FOR ASYMMETRY OF MAGNETORESISTIVE READ ELEMENT

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

Disk drives may employ a head having an inductive write element (coil) and a magnetoresistive (MR) read element. An MR read element may exhibit a non-linear response leading to asymmetrical positive/negative pulses in the read signal. Prior art techniques attempt to compensate for the MR asymmetry using a non-linear correction circuit implementing a second-order function:

$$x+\beta x^2.$$

The coefficient $\beta$ in the above equation may be adapted using a learning algorithm that attempts to minimize an error metric. However, the error metric is typically measured by evaluating the read signal samples after being filtered by a continuous-time filter as well as a discrete-time equalizer. The latency of the continuous-time filter and discrete-time equalizer introduces a transport delay into the closed-loop adaptation system that degrades performance and increases convergence time.

BRIEF DESCRIPTION OF THE DRAWINGS

FIG. 2A shows a disk drive according to an embodiment of the present invention comprising a head actuated over a disk, the head comprising an MR read element.

FIG. 2B is a flow diagram according to an embodiment of the present invention wherein an asymmetry of the MR read element is estimated by processing the read signal in continuous-time.

DETAILED DESCRIPTION OF EMBODIMENTS OF THE INVENTION

FIG. 2A shows a disk drive according to an embodiment of the present invention comprising a head 16 actuated over a disk 18, the head 16 comprising a magnetoresistive (MR) read element. The disk drive further comprises control circuitry 20 operable to execute the flow diagram of FIG. 2B, wherein an analog read signal 22 emanating from the MR read element is amplified (step 24) to generate an amplified analog read signal. The amplified analog read signal is filtered in continuous-time to extract a dc component (step 26), and an amplitude of the amplified analog read signal is measured in continuous-time (step 28). An asymmetry in the amplified analog read signal is estimated in response to the dc component and the amplitude (step 30), and the amplified analog read signal is modified in response to the estimated asymmetry to generate a compensated analog read signal (step 32). The compensated analog read signal is filtered using an analog filter to generate a filtered analog read signal (step 34). The filtered analog read signal is sampled to generate read signal samples (step 36), and the read signal samples are filtered using a discrete-time equalizer (step 38).

Figure 1:
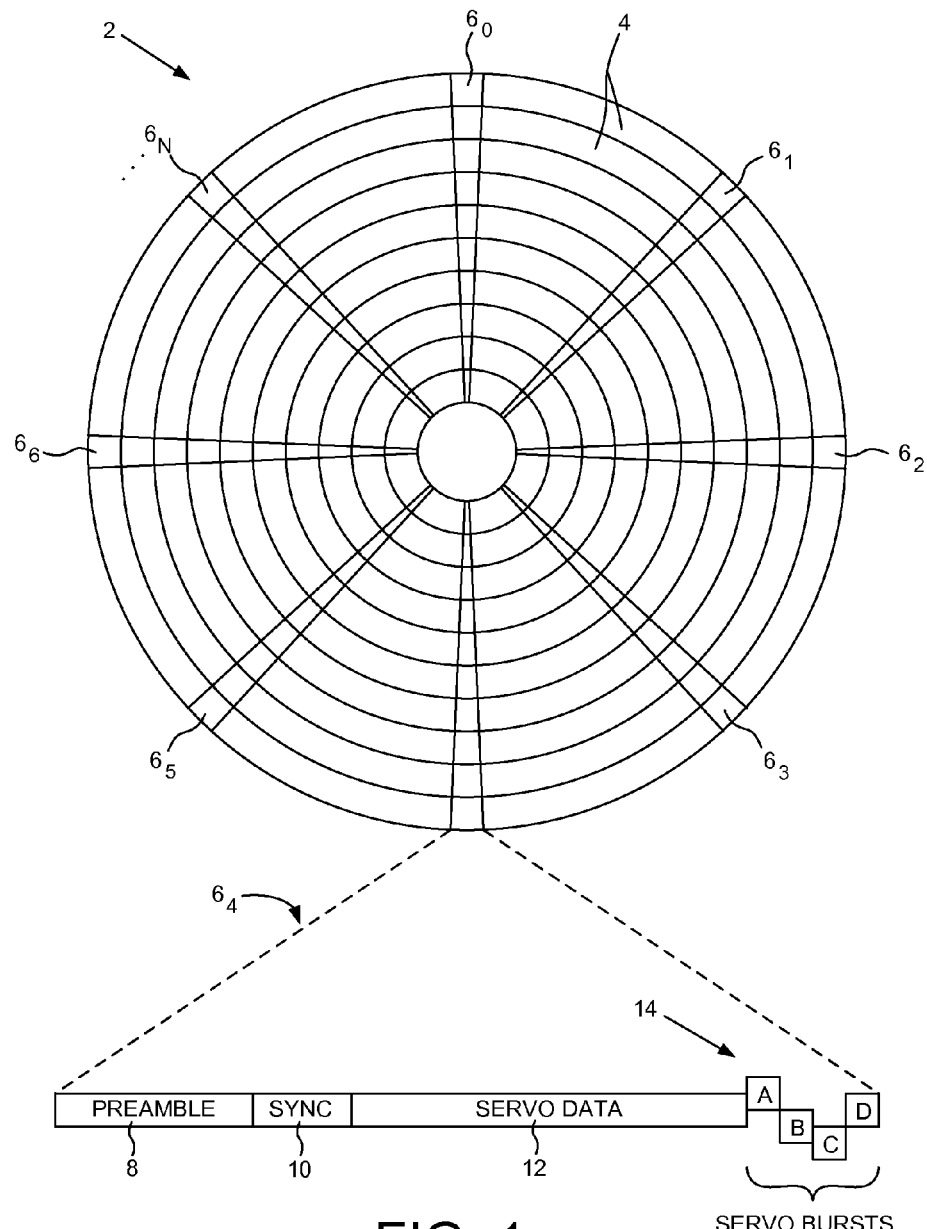
FIG. 1 shows a prior art disk format comprising a plurality of servo tracks defined by embedded servo sectors.

In the embodiment of FIG. 2A, the disk 18 comprises embedded servo sectors $40_0$-$40_N$ that define a plurality of servo tracks 42. The control circuitry 20 processes the read signal 22 emanating from the head 16 to demodulate the servo sectors $40_0$-$40_N$ and generate a position error signal (PES) representing an error between the actual position of the head and a target position relative to a target track. The control circuitry 20 filters the PES using a suitable compensation filter to generate a control signal 44 applied to a voice coil motor (VCM) 46 which rotates an actuator arm 48 about a pivot in order to actuate the head 16 radially over the disk in a direction that reduces the PES. The servo sectors $40_0$-$40_N$ may comprise any suitable position information, such as a track address for coarse positioning and servo bursts for fine positioning. The servo bursts may comprise any suitable pattern, such as the amplitude-based servo pattern shown in FIG. 1, or a suitable phase-based servo pattern.

Figure 3A:
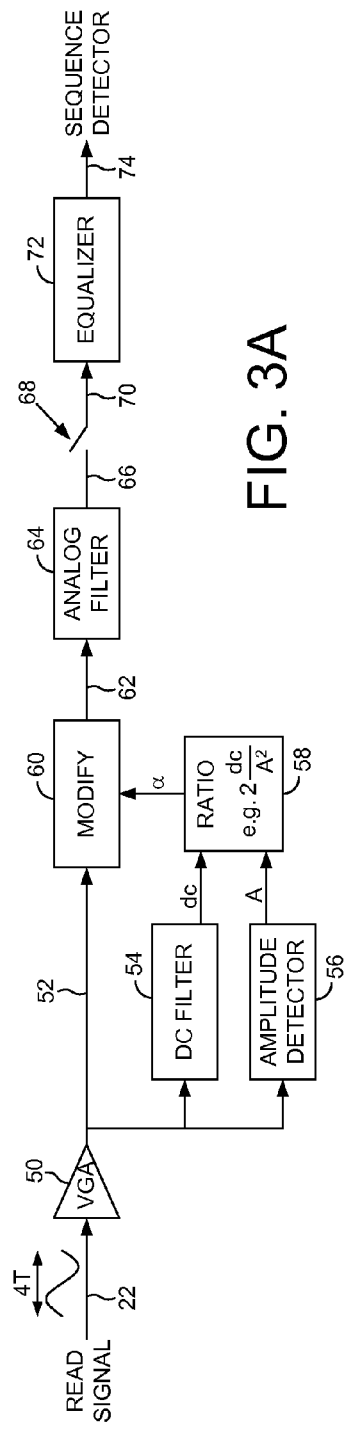
FIG. 3A shows control circuitry according to an embodiment of the present invention comprising a continuous-time DC filter and amplitude detector for estimating the asymmetry of the MR read element.

FIG. 3A shows control circuitry according to an embodiment of the present invention wherein the analog read signal 22 is generated by reading a periodic pattern from the disk, such as a periodic pattern comprising a period of 4T where T is a sample interval. A variable gain amplifier (VGA) 50 amplifies the analog read signal 22 to generate the amplified analog read signal 52. A continuous-time dc filter 54 extracts the dc component from the amplified analog read signal 52, and a continuous-time amplitude detector 56 measures an amplitude A of the amplified analog read signal 52. Continuous-time circuitry 58 estimates an asymmetry a in the amplified analog read signal 52 in response to a ratio of the dc component to the amplitude A. In the example of FIG. 3A, the continuous-time circuitry 58 estimates the asymmetry a according to:

$$2\frac{dc}{A^2}.$$

The amplified analog read signal 52 is modified 60 in response to the estimated asymmetry α to generate a compensated analog read signal 62. The compensated analog read signal 62 is filtered using an analog filter 64 to generate a filtered analog read signal 66. The filtered analog read signal 66 is sampled 68 to generate read signal samples 70, and the read signal samples 70 are filtered using a discrete-time equalizer 72.

In one embodiment, the read signal samples 70 are generated (using synchronous or asynchronous sampling) at a sample interval substantially equal to a baud rate of the written data. The discrete-time equalizer 72 equalizes the read signal samples 70 according to a partial response, and a suitable sequence detector detects an estimated data sequence from the equalized read signal samples 74. Accordingly, in the embodiments of the present invention the asymmetry estimation and compensation is performed in continuous-time on the amplified analog read signal 52 so as to avoid the latency of the analog filter 64 and discrete-time equalizer 72.

Figure 3B:
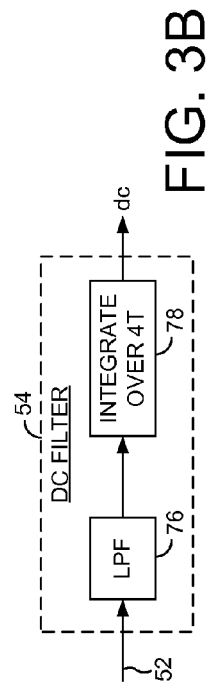
FIG. 3B shows an example continuous-time DC filter according to an embodiment of the present invention.
Figure 3C:
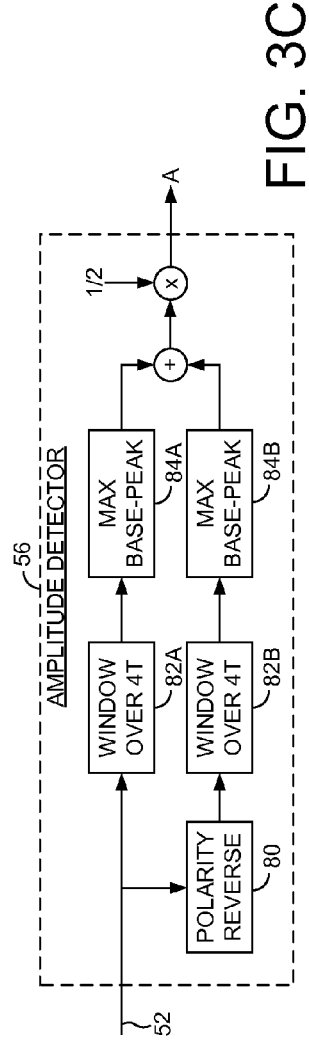
FIG. 3C shows an example continuous-time amplitude detector according to an embodiment of the present invention.

FIG. 3B shows a continuous-time dc filter 54 according to an embodiment of the present invention comprising a suitable analog low-pass filter (LPF) 76 followed by an analog integrator 78 which integrates the output of the LPF 76 over a 4T interval to extract the dc component. FIG. 3C shows a continuous-time amplitude detector 56 according to an embodiment of the present invention comprising a polarity reversal circuit 80 and circuitry 82A and 82B for generating a first 4T window over the non-inverted amplified analog read signal 52 and a second 4T window over the inverted amplified analog read signal 52. A first analog circuit 84A measures a maximum base-to-peak amplitude of the non-inverted amplified analog read signal 52 over the 4T window, and a second analog circuit 84B measures a maximum base-to-peak amplitude of the inverted amplified analog read signal 52 over the 4T window. The result of the maximum base-to-peak amplitude measurements are added and then divided by two to generate the measured amplitude A.

Figure 4:
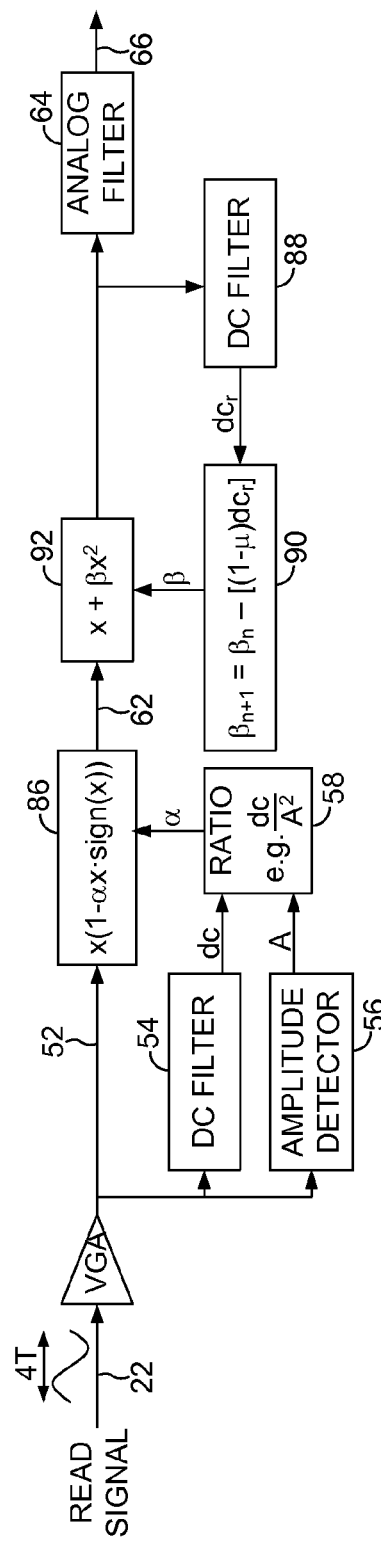
FIG. 4 shows control circuitry according to an embodiment of the present invention comprising a continuous-time asymmetry compensation loop for attenuating a residual asymmetry in the read signal.

FIG. 4 shows control circuitry according to an embodiment of the present invention wherein the amplified analog read signal 52 is modified 86 in response to the estimated asymmetry a according to:

$$x(1-\alpha x \cdot \text{sign}(x))$$

where x represents the amplified analog read signal 52. In this embodiment, the effect of the above equation is to decrease the magnitude of an isolated positive pulse by αx and to increase the magnitude of an isolated negative pulse by αx. However, the amplified analog read signal 52 may be modified in response to the estimated asymmetry α using any suitable equation.

FIG. 4 also illustrates an embodiment of the present invention wherein a residual dc component ($dc_r$) is extracted 88 in continuous-time from the compensated analog read signal 62. A coefficient β is adapted in continuous-time 90 in response to the residual dc component ($dc_r$), and the compensated analog read signal 62 is modified 92 in continuous-time according to:

$$x+\beta x^2$$

where x is the compensated analog read signal 62. In the embodiment of FIG. 4, the coefficient is adapted 90 according to:

$$\beta_{n+1}=\beta_n-[(1-\mu)dc_r]$$

where $dc_r$ is the residual dc component, and μ is a learning coefficient.

Figure 5:
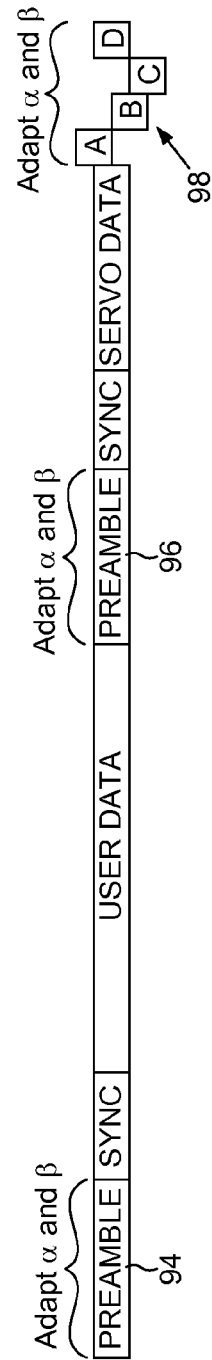
FIG. 5 shows an embodiment of the present invention wherein the asymmetry compensation is adapted while reading at least one of a data or servo sector preamble, or a servo burst.

In one embodiment, the control circuitry 20 is operable to concurrently estimate the asymmetry α and adapt the coefficient β while reading a periodic pattern from the disk. For example, in one embodiment illustrated in FIG. 5, the periodic pattern comprises at least one of a preamble pattern 94 preceding a data sector, a preamble pattern 96 preceding a servo sector, and a servo burst 98 of a servo sector. In one embodiment, the preamble and/or servo burst comprises a 2T pattern having a period of 4T (4 sample intervals).

Because the asymmetry α is estimated in continuous-time by evaluating the amplified analog read signal 52 and compensating 60 for the asymmetry α in continuous-time, the latency of estimating and/or compensating for the asymmetry after the analog filter 64 is avoided. Similarly, the embodiment of FIG. 4 adapts the coefficient β in continuous-time prior to the analog filter 64 thereby avoiding the associated latency. Avoiding the latency of the analog filter 64 (and discrete-time equalizer 72) enables the estimated asymmetry a (and optionally the coefficient β) to converge quickly over a relatively short periodic pattern. Accordingly, in one embodiment the fast convergence speed enables real-time asymmetry compensation while reading the preamble of a data sector (while writing or reading the data sector), and/or real-time asymmetry compensation while reading the preamble and/or servo bursts of a servo sector (during write or read operations).

In an alternative embodiment, the control circuitry 20 may execute a calibration procedure wherein a periodic pattern is written to the disk, such as by writing a 2T pattern to a data sector or a data wedge (area between servo sectors), and then reading the periodic pattern in order to estimate the asymmetry α and adapt the coefficient β. The calibration procedure may be executed at a number of different radial locations (i.e., zones) and the corresponding asymmetry estimate α and coefficient β saved in a table that is indexed during normal operation when accessing a particular zone. The estimated asymmetry α and coefficient β stored in the table may be updated periodically by re-executing the calibration procedure over time to account for changes in the MR read element over time. In addition, the asymmetry α may be estimated and coefficient β may be further adapted in real-time when reading a preamble or servo burst during normal access operations as described above.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk, the head comprising a magnetoresistive (MR) read element; and
   control circuitry operable to:
      amplify an analog read signal emanating from the MR read element to generate an amplified analog read signal;
      filter the amplified analog read signal in continuous-time to extract a dc component;
      measure an amplitude of the amplified analog read signal in continuous-time;
      estimate an asymmetry in the amplified analog read signal in response to the dc component and the amplitude;
      modify the amplified analog read signal in response to the estimated asymmetry to generate a compensated analog read signal;
      filter the compensated analog read signal using an analog filter to generate a filtered analog read signal;
      sample the filtered analog read signal to generate read signal samples; and
      filter the read signal samples using a discrete-time equalizer.

2. The disk drive as recited in claim 1, wherein the control circuitry is further operable to read a periodic pattern from the disk to generate the analog read signal.

3. The disk drive as recited in claim 2, wherein the periodic pattern comprises a period of 4T where T is a sample interval.

4. The disk drive as recited in claim 3, wherein the control circuitry is operable to estimate the asymmetry according to:

$$2\frac{dc}{A^2}$$

where:
dc is the dc component; and
A is the amplitude of the amplified analog read signal.

5. The disk drive as recited in claim 4, wherein the control circuitry is operable to filter the amplified analog read signal in continuous-time to extract the dc component by:
   low pass filtering the amplified analog read signal in continuous-time to generate an analog dc signal; and
   integrating the analog dc signal over a 4T interval.

6. The disk drive as recited in claim 4, wherein the control circuitry is operable to measure the amplitude of the amplified analog read signal in continuous-time by measuring a maximum base-to-peak magnitude in continuous-time over a 4T interval.

7. The disk drive as recited in claim 1, wherein the control circuitry is further operable to:
   extract a residual dc component from the compensated analog read signal in continuous-time;
   adapt a coefficient $\beta$ in continuous-time in response to the residual dc component; and
   modify the compensated analog read signal in continuous-time according to:

$$x+\beta x^2$$

where x is the compensated analog read signal.

8. The disk drive as recited in claim 7, wherein the control circuitry is operable to adapt the coefficient $\beta$ according to:

$$\beta_{n+1}=\beta_n-[(1-\mu)dc_r]$$

where $dc_r$ is the residual dc component; and
$\mu$ is a learning coefficient.

9. The disk drive as recited in claim 8, wherein the control circuitry is operable to concurrently estimate the asymmetry and adapt the coefficient $\beta$ while reading a periodic pattern from the disk.

10. The disk drive as recited in claim 9, wherein the periodic pattern comprises at least one of a preamble pattern preceding a data sector, a preamble pattern preceding a servo sector, and a servo burst of a servo sector.

11. The disk drive as recited in claim 1, wherein:
   the control circuitry is further operable to read a periodic pattern on the disk to generate the analog read signal; and
   the periodic pattern comprises at least one of a preamble pattern preceding a data sector, a preamble pattern preceding a servo sector, and a servo burst of a servo sector.

12. A method of operating a disk drive, the disk drive comprising a disk, a head actuated over the disk, the head comprising a magnetoresistive (MR) read element, the method comprising:
   amplifying an analog read signal emanating from the MR read element to generate an amplified analog read signal;
   filtering the amplified analog read signal in continuous-time to extract a dc component;
   measuring an amplitude of the amplified analog read signal in continuous-time;
   estimating an asymmetry in the amplified analog read signal in response to the dc component and the amplitude;
   modifying the amplified analog read signal in response to the estimated asymmetry to generate a compensated analog read signal;
   filtering the compensated analog read signal using an analog filter to generate a filtered analog read signal;
   sampling the filtered analog read signal to generate read signal samples; and
   filtering the read signal samples using a discrete-time equalizer.

13. The method as recited in claim 12, further comprising reading a periodic pattern from the disk to generate the analog read signal.

14. The method as recited in claim 13, wherein the periodic pattern comprises a period of 4T where T is a sample interval.

15. The method as recited in claim 14, further comprising estimating the asymmetry according to:

$$2\frac{dc}{A^2}$$

where:

dc is the dc component; and

A is the amplitude of the amplified analog read signal.

16. The method as recited in claim 15, further comprising filtering the amplified analog read signal in continuous-time to extract the dc component by:

low pass filtering the amplified analog read signal in continuous-time to generate an analog dc signal; and integrating the analog dc signal over a 4T interval.

17. The method as recited in claim 15, further comprising measuring the amplitude of the amplified analog read signal in continuous-time by measuring a maximum base-to-peak magnitude in continuous-time over a 4T interval.

18. The method as recited in claim 12, further comprising:

extracting a residual dc component from the compensated analog read signal in continuous-time;

adapting a coefficient β in continuous-time in response to the residual dc component; and modifying the compensated analog read signal in continuous-time according to:

$x+\beta x^2$ where x is the compensated analog read signal.

19. The method as recited in claim 18, further comprising adapting the coefficient β according to:

$\beta_{n+1}=\beta_n-[(1-\mu)dc_r]$ where $dc_r$ is the residual dc component; and μ is a learning coefficient.

20. The method as recited in claim 19, further comprising concurrently estimating the asymmetry and adapting the coefficient β while reading a periodic pattern from the disk.

21. The method as recited in claim 20, wherein the periodic pattern comprises at least one of a preamble pattern preceding a data sector, a preamble pattern preceding a servo sector, and a servo burst of a servo sector.

22. The method as recited in claim 12, wherein:

further comprising reading a periodic pattern on the disk to generate the analog read signal; and the periodic pattern comprises at least one of a preamble pattern preceding a data sector, a preamble pattern preceding a servo sector, and a servo burst of a servo sector.

* * * * *